United States Patent [19]

Maekawa et al.

[11] Patent Number: 5,838,324

[45] Date of Patent: Nov. 17, 1998

[54] INFORMATION PROCESSING APPARATUS FOR DISPLAYING A PLURALITY OF MODES OF OPERATION THEREOF

[75] Inventors: Tomohiro Maekawa, Yokohama; Kaoru Kumagai, Tokyo, both of Japan

[73] Assignee: Canon Kabushiki Kaisha, Tokyo, Japan

[21] Appl. No.: 357,154

[22] Filed: Dec. 15, 1994

Related U.S. Application Data

[63] Continuation of Ser. No. 927,799, Aug. 10, 1992, abandoned, which is a continuation of Ser. No. 794,858, Nov. 21, 1991, abandoned, which is a continuation of Ser. No. 270,456, Nov. 7, 1988, abandoned, which is a continuation of Ser. No. 14,180, Feb. 11, 1987, abandoned, which is a continuation of Ser. No. 694,845, Jan. 25, 1985, abandoned.

[30] Foreign Application Priority Data

Jan. 31, 1984 [JP] Japan ................................. 59-16287
Jan. 31, 1984 [JP] Japan ................................. 59-16290

[51] Int. Cl.$^6$ ......................................................... G06F 17/21
[52] U.S. Cl. ................................................ 345/352; 707/530
[58] Field of Search ...................................... 395/100, 118, 395/155, 156, 157, 161; 400/3, 61, 63, 70, 76, 83, 279; 345/141, 145, 352; 707/530

[56] References Cited

U.S. PATENT DOCUMENTS

| | | | |
|---|---|---|---|
| 4,389,641 | 6/1983 | Nakanishi et al. ...................... | 345/160 |
| 4,479,197 | 10/1984 | Haag et al. ............................. | 395/354 |
| 4,527,917 | 7/1985 | Ueno ....................................... | 400/70 |
| 4,528,560 | 7/1985 | Bergermann et al. .................. | 345/157 |

FOREIGN PATENT DOCUMENTS

| | | | |
|---|---|---|---|
| 2087115 | 5/1982 | United Kingdom ................ | 400/144.2 |

OTHER PUBLICATIONS

Smith et al., Designing the Star User Interface, BYTE, pp. 242–282, Apr. 1982.

Morgan, An Interview With Wayne Rosing, Bruce Daniels and Larry Tessler, BYTE, pp. 90–114, Feb. 1983.

Ratliff, dBase II User Manual, 1992, pp. 66–69, 1982.

McMullen et al., A Close Look at 1–2–3's Spreadsheet, Popular Computing, Dec. 1983, p.123.

Miller, 1–2–3 and MBA, Popular Computing, Dec. 1983, pp. 118,122, 124, 128, 130, 131, 132.

*Primary Examiner*—Anton Fetting
*Attorney, Agent, or Firm*—Fitzpatrick, Cella, Harper & Scinto

[57] ABSTRACT

An information processing apparatus has a keyboard including a single, mode designation key, a display having display areas for displaying groups of operation modes of similar nature, a memory for storing input information and a designated operation mode, a non-volatile memory for saving mode information, and a controller for controlling the operation sequence of the apparatus. A desired operation mode can be designated with simple key input operation.

40 Claims, 7 Drawing Sheets

INFORMATION PROCESSING APPARATUS FOR DISPLAYING A PLURALITY OF MODES OF OPERATION THEREOF

This application is a continuation of application Ser. No. 07/927,799 filed Aug. 10, 1992, now abandoned, which application is a continuation of application Ser. No. 07/794,858 filed Nov. 21, 1991, now abandoned, which application is a continuation of application Ser. No. 07/270,456 filed Nov. 7, 1988, now abandoned, which application is a continuation of application Ser. No. 07/014,180 filed Feb. 11, 1987, now abandoned, which application is a continuation of application Ser. No. 06/694,845 filed Jan. 25, 1985, now abandoned.

BACKGROUND OF THE INVENTION

1. Field of the Invention

The present invention relates to an information processing apparatus with an improved mode setting operation during information processing.

2. Description of the Prior Art

A conventional information processing apparatus has various modes such as a line pitch mode for designating a line pitch, an operation mode for designating a printing mode such as printing upon inputting of each character, a carrier return mode for designating each mode of a carrier return, and a keyboard select mode for selecting a keyboard in correspondence with a character printed on each key. Confirmation of mode selection is made according to printing and engraving near processing mode switches However, in this conventional system, the user cannot easily confirm a mode presently selected. With a view to this problem, in an improved conventional system, a presently designated mode is indicated by a display such as an LED or a lamp.

Although this method allows easy confirmation, need for more than one LED or lamp results in a costly apparatus. Furthermore, since LEDs or lamps consume much power, the life of batteries as a power source for an electronic typewriter is shortened. Thus, an information processing apparatus having a lower power consumption rating has been desired.

A typewriter with display indicators is also known. In such a typewriter, display indicators are arranged near corresponding mode switches and are used to input or correct information. In this typewriter, if the operator tries to confirm a presently designated mode during key input, he must move his eye a large distance between a mode designation means and display indicator. As a result, smooth key input is interrupted and operability is impaired.

In electronic equipment of the type described above, more than one mode is generally designated to perform more than one function. In a mode designation device allowing this capability, a mode display is arranged in a display of the electronic equipment. Every time a single, mode designation key is depressed, the designated mode is sequentially changed and the newly designated mode is displayed.

For example, a single mode key K for designating modes, and a mode display M for displaying the mode designation order are used. Every time the mode key K is depressed, the corresponding mode is sequentially flashed or blinked at the mode display M.

However, in a mode selection device of this type, when there are a large number of operation modes to be displayed, the mode key K must be depressed many times in order to flash or blink the desired mode. This results in a cumbersome key input operation.

SUMMARY OF THE INVENTION

It is an object of the present invention to provide an information processing apparatus which is free from the drawbacks of conventional information processing apparatuses and which has a display for displaying input characters and including means for allowing confirmation of a processing mode of the input characters, so that operability is improved and power consumption is reduced.

It is another object of the present invention to provide a mode designation system and device which are free from the drawbacks of conventional information processing apparatuses and which allow quick designation and display of a desired operation mode with simple key input operation.

It is still another object of the present invention to provide a mode designation system and device in which a number of operation modes are divided into a plurality of groups of operation modes which are similar to each other and a group corresponding to the desired mode is designated first and then the modes in this group are displayed. The operator can then select the desired mode among the displayed modes by depressing a single mode key and the corresponding mode is then displayed.

BRIEF DESCRIPTION OF THE DRAWINGS

FIG. 4 composed of FIGS. 4(a) to 4(c) is a flow chart showing the mode of operation of the typewriter shown in FIG. 1.

DETAILED DESCRIPTION OF THE PREFERRED EMBODIMENT

The present invention will be described in detail with reference to the accompanying drawings.

Figure 1:
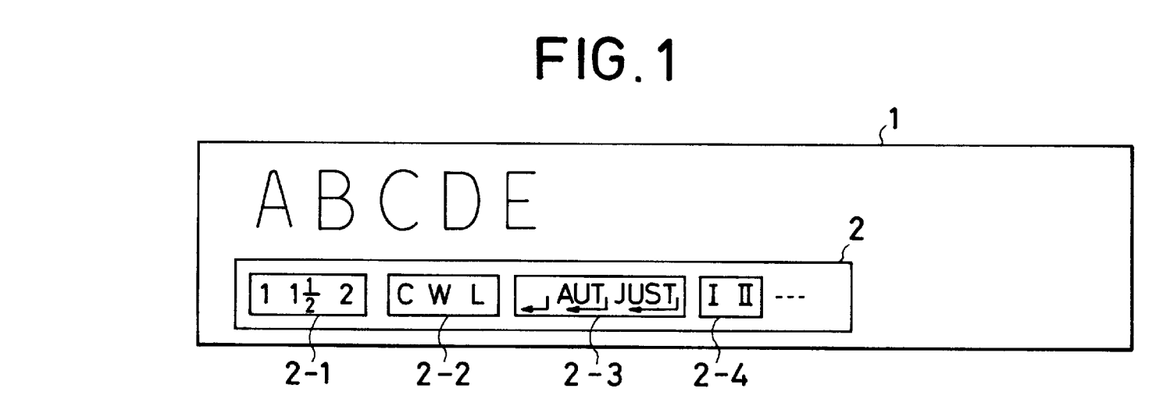
FIG. 1 is a diagram showing an example of a mode display of an electronic typewriter to which an information processing apparatus of the present invention is applied.

FIG. 1 shows an example of a display of an electronic typewriter to which an information processing apparatus according to the present invention is applied.

A character display or an LCD 1 constituting a first display means can display a line of characters by dot display. The display 1 has a character display area for displaying characters, and a mode display area 2 constituting a second display means for displaying in a line the names of a plurality of operation modes. The mode display area 2 has blocks 2-1, 2—2, 2-3, 2-4, and so on which respectively correspond to groups of operation modes of similar nature. Only a desired group or a desired mode is flashed or blinked to display the designated mode. A display buffer (FIG. 3) BUF memory having a capacity corresponding to the display capacity of the LCD 1 is also included.

In the block 2-1, for example, line spacings of the typewriter, i.e., line pitches 1, 1(½) and 2 (lines), which are display indicators, are displayed. The mode is selected to feed paper by a designated line pitch when an index key, a REV INDEX key, or a return key RTN constituting a carriage return input means or directing means for directing the cursor from a first block in which display 1 displays a type of mode to a second block having a different type of mode, is depressed or when an automatic carrier return must be made.

The block 2—2 corresponds to the operation mode for designating printing in units of characters (C), words (W), and lines (L). When the display indicator "C" is selected, printing is performed upon input of each character as in a normal typewriter. The input character is not displayed at the display 1 in this case. When the display indicator "W" is selected, the input character is displayed at the display 1. Printing is performed when a space key 5 (FIG. 2), a tab set key 6, or the return key RTN is depressed. When the display indicator "L" is selected, the input character is displayed at the display 1, and printing is performed in units of lines upon depression of the tab set key 6 or the return key RTN.

The block 2-3 is for designating various modes of an automatic carrier return. The display indicator " ↵ " corresponds to the manual mode. In this mode, only when the return key RTN is depressed, is the carrier automatically moved to the left margin of the next line. The display indicator " AUT " corresponds to the automatic carrier return mode. In this mode, when the space key 5 or a hyphen/underline key ⊟ is depressed within a predetermined range (hot zone) before the right margin, the carrier is automatically moved to the left margin of the next line. The display indicator " JUST " corresponds to the justified automatic carrier return mode. In this mode, input characters are displayed at the display 1. When the space key 5 or the key ⊟ is depressed in the hot zone, spaces between words in this line are proportionally distributed and the line is printed with the right margin justification. The block 2-4 corresponds to the keyboard selection mode. Two different characters are engraved at left and right sides at the top of each key 4. In order to select input/printing of character on either side of each key 4, the display indicator "I" or "II" is selected in this mode. When "I" is selected, characters at the left sides of the keys 4 can be input and printed. When "II" is selected, characters at the right sides of the keys 4 can be input and printed.

Although not illustrated in FIG. 1, various other modes can also be included and displayed at the display 1. Such other modes include a printing mode for designating normal printing, bold printing, or heavy printing or automatic underlining with one of these printing methods; a selection mode for designating a typeface or character pitch; or modes for designating a printing pressure, a decimal tab and the like.

Figure 2:
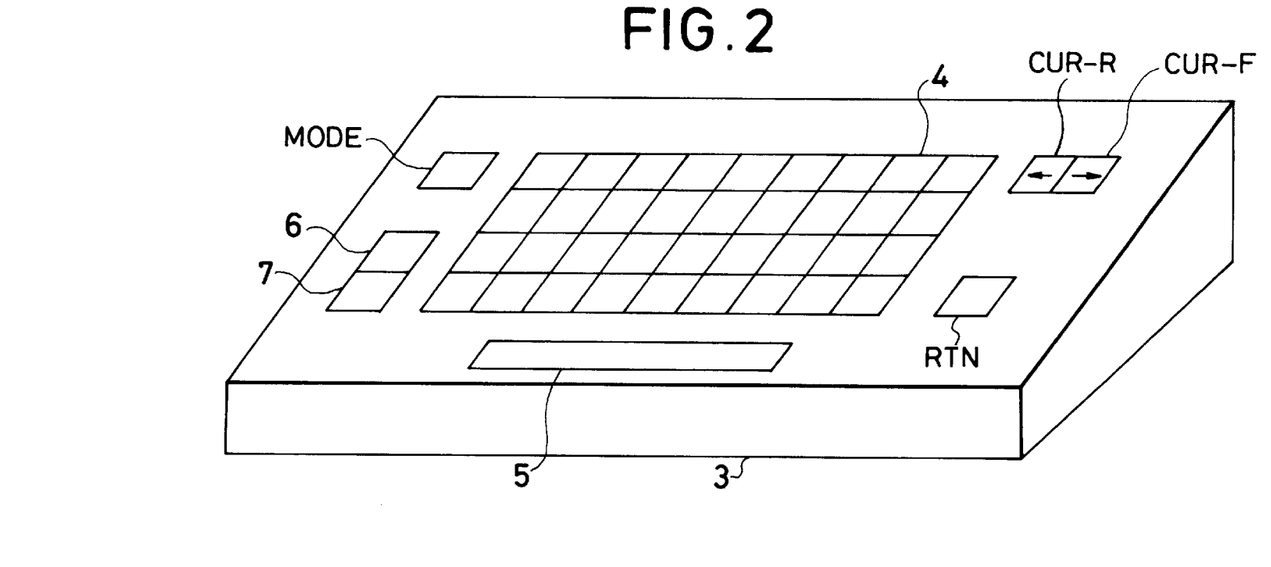
FIG. 2 is a perspective view showing an example of a keyboard for use in the typewriter shown in FIG. 1.

FIG. 2 illustrates an example of a keyboard of the electronic typewriter according to the present invention. The keyboard 3 illustrated in FIG. 2 has character keys 4 constituting character input means; function keys such as the space key 5, the tab set key 6, or a tab clear key 7; an operation mode key MODE constituting a mode set directing means for directing a plurality of types of modes to be set or for designating a desired operation mode; a cursor designating jaeans for shifting a cursor to designate different display positions of a mode in a block displayed by display 1 comprising a right movement key CUR-F for moving the cursor to the right and a left movement key CUR-R for moving the cursor to the left; and the return key RTN. According to another aspect, the invention comprises cursor selecting means for selecting a mode by designating a display position of the mode in a displayed block by shifting a cursor, which comprises right movement key CUR-F and left movement key CUR-R. According to still another aspect, the present invention comprises a designation input means for selecting a mode by shifting a cursor when the mode key MODE directs a mode setting, and for designating with the cursor an input position of a character signal by an input means or keyboard 3 when the mode key MODE has not directed a mode setting. The designation input means comprises a right movement key CUR-F and a left movement key CUR-R.

The key MODE is a single, mode designating key for controlling start or stop of display/blinking of each mode display at the display area 2 shown in FIG. 1.

The keys CUR-F and CUR-R are used to move the cursor (display/blinking of designated mode) to the right or to the left when they are depressed together with the key MODE. The keys CUR-F and CUR-R therefore serve as right and left blinking shift keys.

The key RTN serves as a group designation key for controlling start/stop of display/blinking in units of the mode display groups 2-1, 2—2, 2-3, 2-4 when it is depressed together with the mode key MODE.

Keys to be used in combination with the mode key MODE are not limited to those mentioned above and other keys such as the keys 5, 6 and 7 shown in FIG. 2 can also be used.

Figure 3:
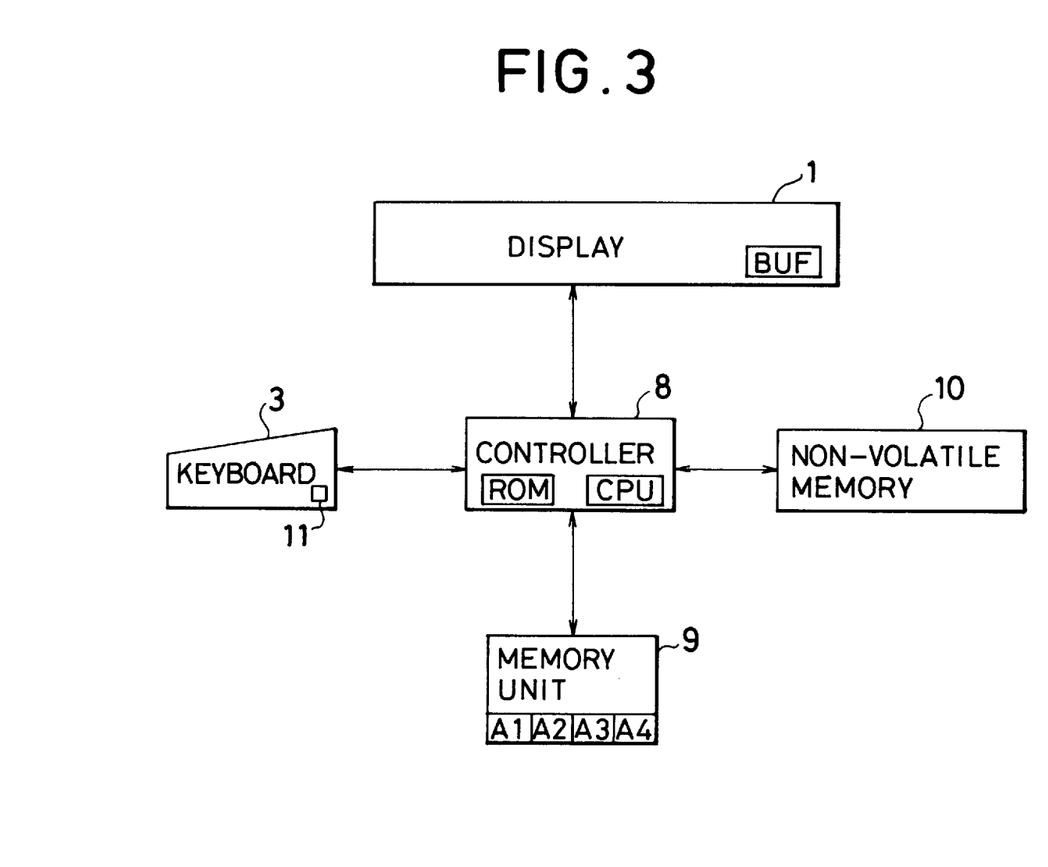
FIG. 3 is a block diagram showing an example of the circuit configuration of the typewriter shown in FIG. 1.
Figure 4A:
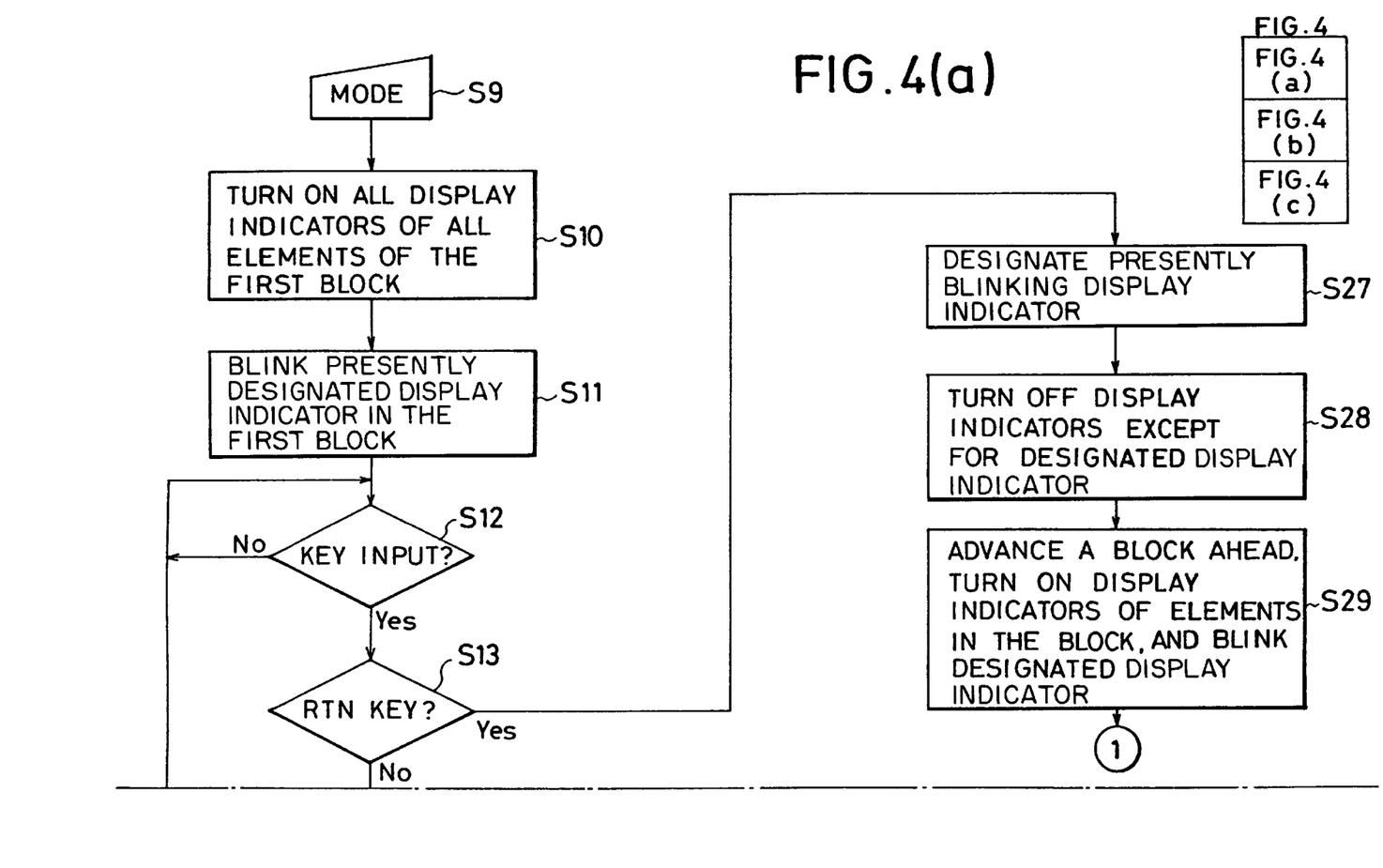
Figure 4B:
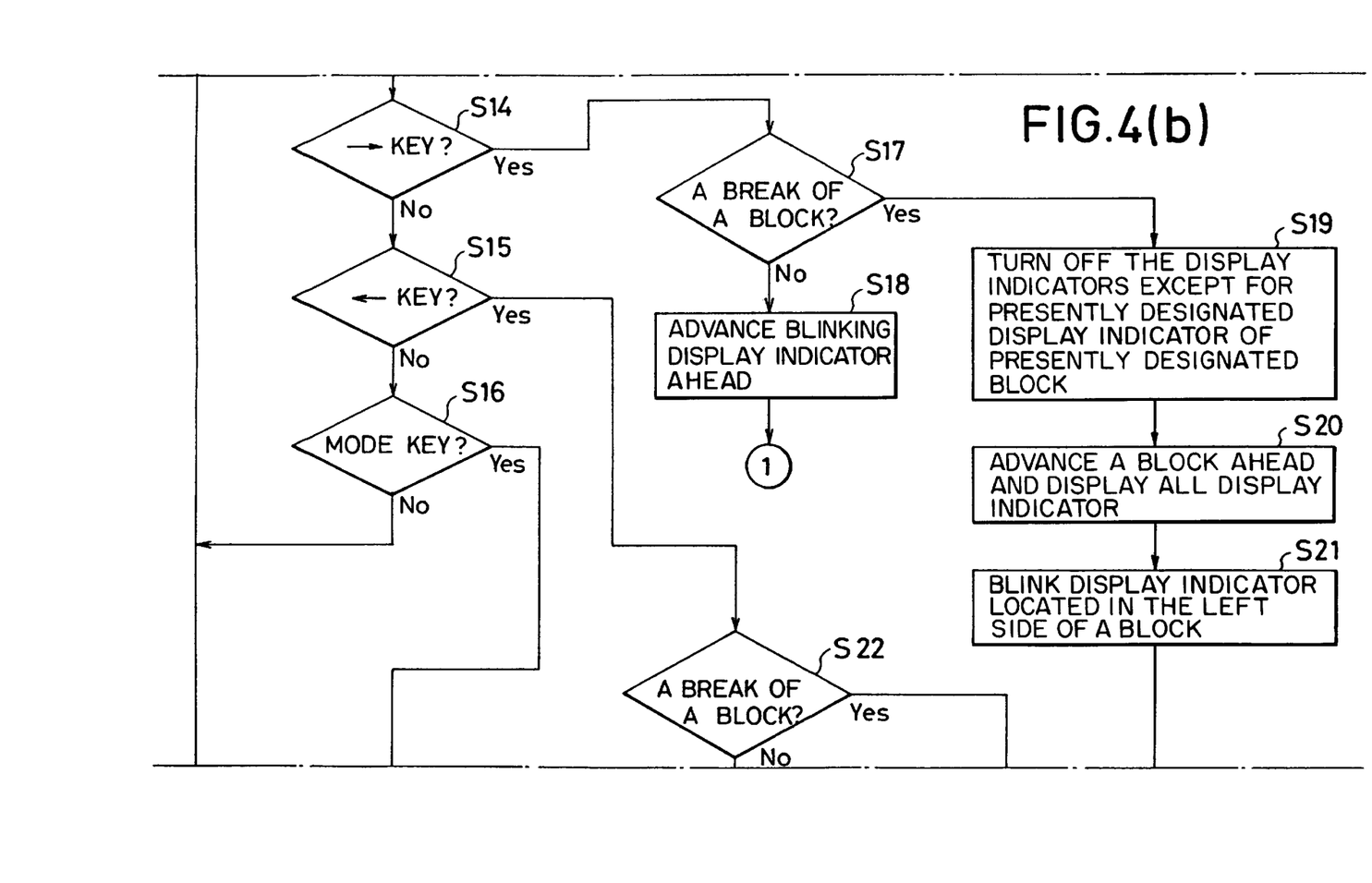
Figure 4C:
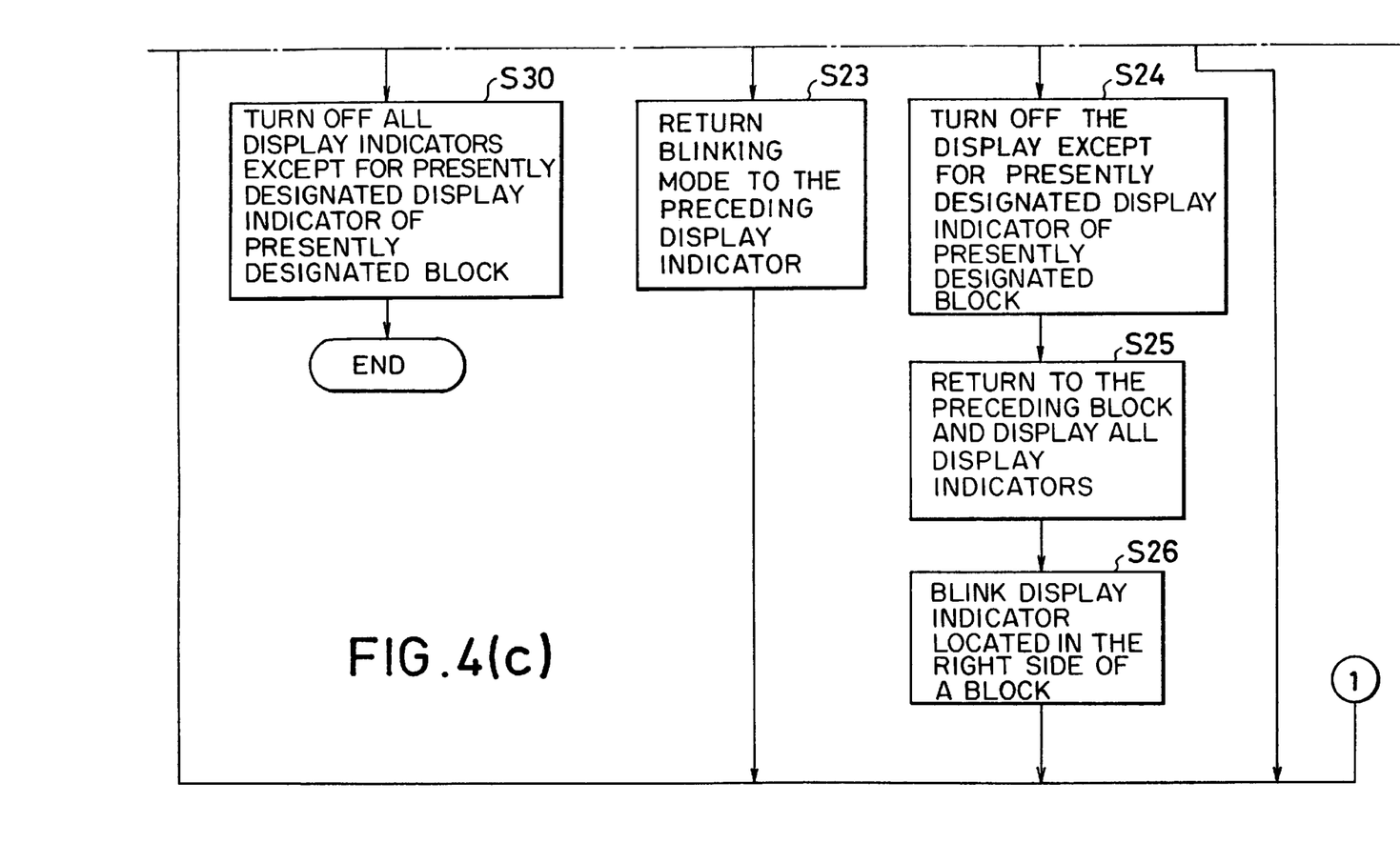

FIG. 3 shows an example of the circuit configuration of the electronic typewriter according to the present invention. In the circuit shown in FIG. 3, the display 1 corresponds to that shown in FIG. 1, and the keyboard 3 corresponds to that shown in FIG. 2. Referring to FIG. 3, a controller 8 has a ROM storing a control program as shown in FIG. 4, a key input processing program and the like, and a processing CPU for executing processing, logic discrimination and the like in accordance with the programs stored in the ROM. Controller 8 acts as a mode selecting means for selecting one of the modes when the cursor designating means, CUR-R and CUR-F, shifts the cursor within a first displayed block having one of the types of modes. Controller 8 also establishes a finally selected mode in the first displayed block at a position where the cursor is located immediately before it is shifted to a second block. Moreover, controller 8 also acts as display control means for controlling the display 1 such that the mode displays in a block except for the mode selected by the mode selecting means are turned off. According to another aspect, the return key RTN acts as directing means for directing the cursor from a first block in which the display 1 displays a type of mode to a second block having a different type of mode. The controller 8 acts as mode setting means for moving the cursor to the second block having a different mode after finally selecting a mode in the first block at a position where the cursor is located immediately before it is moved to the second block. The controller 8 also acts as display control means for controlling the display 1 such that the mode displays in a block except for a mode selected by the mode setting means are turned off. Controller 8 also acts as a display control means for controlling display 1 such that a character corresponding to the character signal input by a input means, i.e., keyboard 3, is displayed at a character input position of a first display area designated by the designation input means CUR-R and CUR-F when the MODE key has not directed a mode setting, and a mode selected by the CUR-R and CUR-F is displayed at the second display area when the MODE key has directed a mode setting. In addition, controller 8 can comprise means for turning off display 1 of all but the mode set in response to a second operation of the MODE key. Also, the controller 8, and a memory unit 9, and an area A3 of memory unit 9 can comprise means for shifting the contents of the buffer memory BUF by an indication from keys CUR-F and CUR-R. A memory unit 9 has an area A1 for storing a character string input from the keyboard 3, an area A2 for storing saved mode information, an area A3 for storing the position of the cursor at the time of mode setting, and an area A4 for storing the mode setting state.

A non-volatile memory 10 constituting a keeper memory stores saved data when a power source switch 11 is turned off. When the power source switch 11 is turned on again, the mode name stored in the non-volatile memory 10 is called and the state before the turning-off of the power source is restored at the display area 2 by the controller 8.

Input information entered by key input at the keyboard 3 is processed by the controller 8. Processing results are displayed at the display 1 and also stored in the memory unit 9. The controller 8 reads out display information from the memory unit 9 and displays the readout information at the display 1.

The memory unit 9 stores the designation display states of the respective blocks at the display area 2 of the display 1 through the controller 8.

An example of mode designation in the electronic typewriter of the configuration described above will be described with reference to the flow chart shown in FIG. 4. In the apparatus shown in FIG. 3, when the power source switch 11 is turned off, the modes which have been designated are saved in the non-volatile memory 10. When the power source switch 11 is turned on again, the mode names are shifted from the memory 10 to the area A2 of the memory unit 9 and displayed at the mode display area 2.

Figure 5:
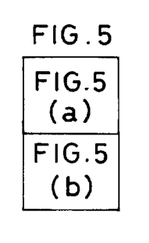
FIG. 5 composed of FIGS. 5(a) and 5(b) show examples of mode displays.
Figure 5A:
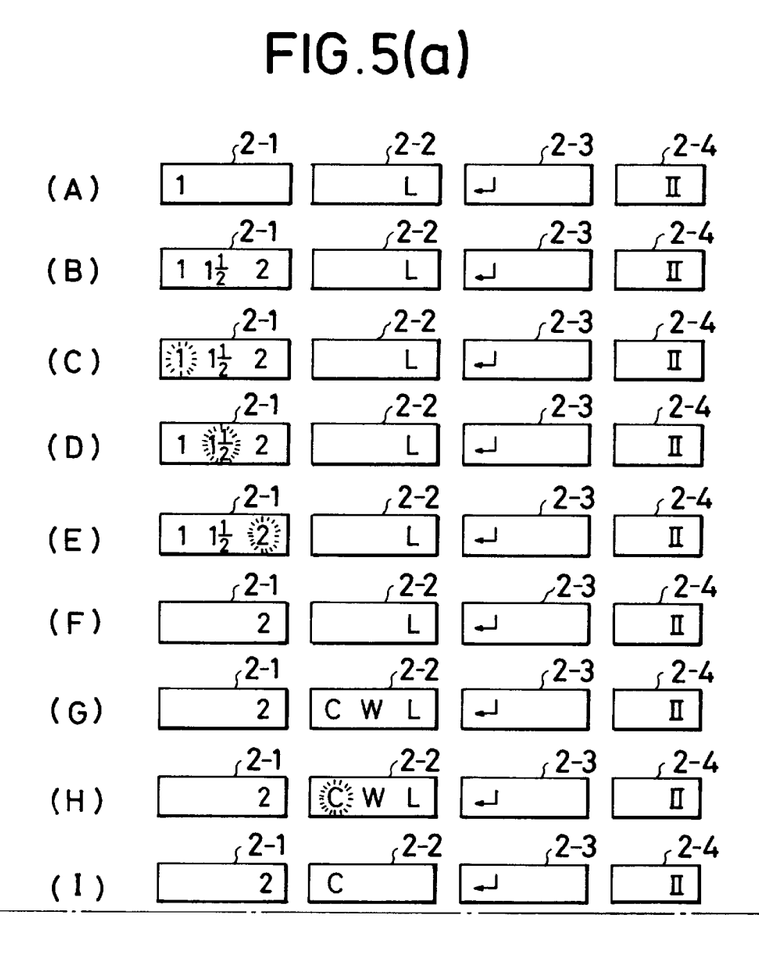

When the power source switch 11 is turned on, in the initial period of mode designation, the designation states of the respective blocks are displayed at the mode display area 2 shown in FIG. 1 as indicated in FIG. 5 (A). "1" is displayed at the block 2-1, "L" is displayed at the block 2—2, "↵" is displayed at the block 2-3, and "II" is displayed at the block 2-4.

Figure 5B:
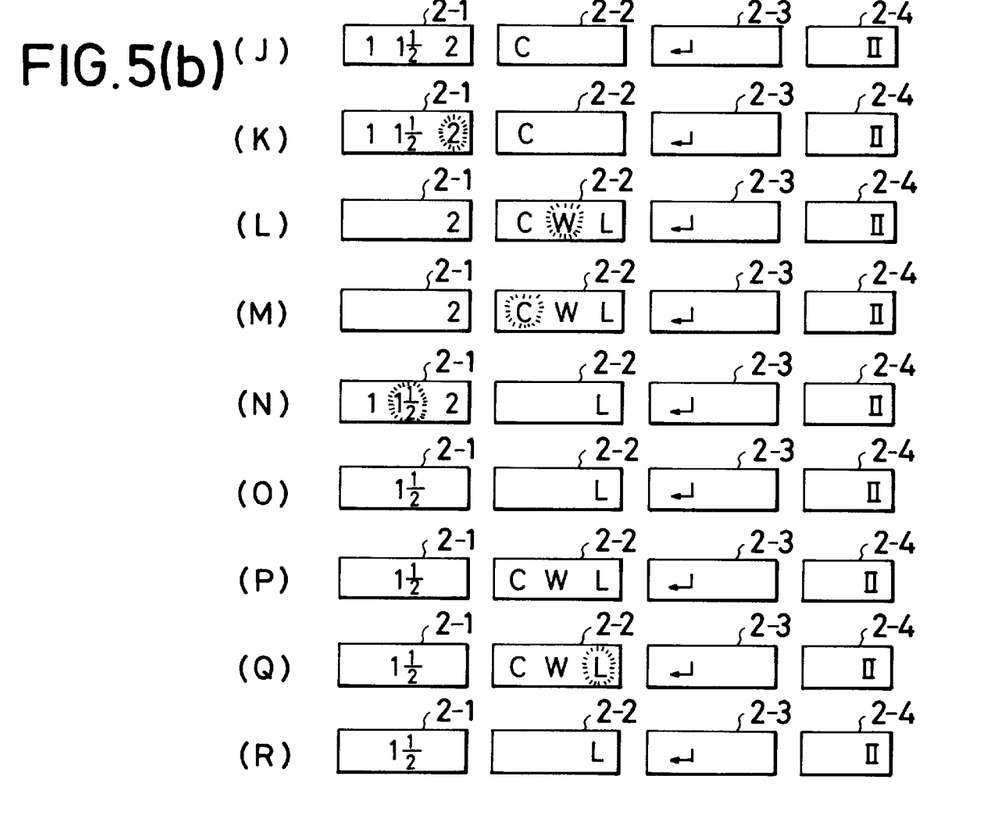

In this state, it is now assumed that the mode designation key MODE is depressed in step S9. Then, "1" is set in the area A4 in step S9, and the flow advances to step S10 in the flow chart shown in FIG. 4. At this time, as shown in FIG. 5 (B), "1" is set at 3 bit positions of the display buffer corresponding to the block 2-1 by the controller 8. Then, all of "1", "1(½)" and "2" are displayed at the block 2-1. The flow then advances to step S11 wherein mode name or indicator "1" which is presently designated in the block 2-1 is blinked in accordance with the set mode in the area A2. The display at the mode display area 2 at this time is as indicated in FIG. 5 (C).

In step S12, the presence or absence of a key input by the operator is repeatedly discriminated by the CPU. When it is determined that there has been a key input, the flow advances to steps S13, S14, S15 and S16 so as to determine which one of the mode designating keys has been depressed. When the depressed key is none of the mode designating keys, the flow returns to step S12 and awaits for the next key input.

When it is determined in step S14 that the depressed key is the key CUR-F, the flow advances to step S17. In step S17, it is checked in accordance with the position information in the area A3 if the presently blinking mode name corresponds to the right side or rightmost mode name in a block, i.e., the mode at a break or boundary with the next block. If the name is not at the rightmost name, the flow advances to step S18 and the next mode name in the block is blinked. For example, blinking of the presently blinking mode, "1", as shown in FIG. 5 (C) is stopped, and the next mode "1(½)" of this block is blinked, as shown in FIG. 5 (D).

However, if the mode name at the rightmost name of the block is blinking, for example, if the mode name blinking in the block 2-1 is "2" as shown in FIG. 5 (E), the flow advances to step S19. As shown in FIG. 5 (F), in step S19, the contents of the 3 bits of the display buffer BUF corresponding to the block 2-1 are set at "0,0,1" so as to leave the name "2" ON and to turn off the remaining names "1" and "1(½)" in this block.

The flow then advances to step S20. In step S20, the processing advances to the block 2—2. As shown in FIG. 5 (G), mode names "C", "W" and "L" within this block 2—2 are all displayed. The contents of the area A3 are also updated. In step S21, as shown in FIG. 5 (H), the name at the left side of this block, for example "C" is blinked.

When it is determined in step S15 that the depressed key is the key CUR-R, the flow advances to step S22. In step S22, it is checked if the presently blinking mode is at the left side or leftmost mode name of the block, i.e., at a break with the preceding block.

If the mode "C" at the left side of the block 2—2 is blinking as shown in FIG. 5 (H), the flow advances to step S24. The mode name at the left side of the presently displayed block, i.e., "C" in the block 2—2 shown in FIG. 5 (D) is left ON and the remaining mode names "W" and "L" in the block 2—2 are turned off, as shown in FIG. 5 (D). In step S25, the preceding block is designated and displayed and all the mode names in the preceding block are turned on as shown in FIG. 5 (J). In step S26, as shown in FIG. 5 (K), the mode name at the right side of this block, i.e., "2" is blinked.

When it is determined in step S22 that the blinking mode name is not located at the left side of the block, e.g., when the mode "W" is blinking in the block 2—2 as shown in FIG. 5 (L), the flow advances to step S23. The blinking mode name is returned to the preceding one. For example, the blinking mode "W" shown in FIG. 5 (L) is changed to the mode "C" shown in FIG. 5 (M).

When it is determined in step S13 that the depressed key is the key RTN, the flow advances to step S27. In step S27, the presently blinking mode name, for example, "1(½)" shown in FIG. 5 (N) is stored in the memory 9. In step S28, the designated mode name "1(½)" in the designated block is left ON and the remaining mode names in this block are turned off. This state is illustrated in FIG. 5 (O). In step S29, the flow advances to the next block 2—2. All the mode names "C", "W" and "L" in the block 2—2 are turned on, as shown in FIG. 5 (P). At this time, the mode name designated by the key MODE, i.e., the mode "L" is blinked. In this manner, the display state as shown in FIG. 5 (N) is switched to that shown in FIG. 5 (Q).

When it is determined in step S16 that the depressed key is the key MODE, the presently blinking mode is the desired mode and this means the present key input is the final one required to designate this desired mode. In step S30, as shown in FIG. 5 (Q), the presently blinking name, "L", is left ON while the remaining modes "C" and "W" of the block 2—2 are turned off. The display as shown in FIG. 5 (R) is obtained. The keys CUR-R and CUR-F return to the normal function keys after this mode designation operation. This also applies to other keys having more than one function.

As described above, according to the present invention, means for confirming a processing mode of input characters is integrally arranged inside an input display of low power consumption. Therefore, when the operator inputs characters while viewing the display, the presently designated processing mode can be easily confirmed. Operability for inputting characters is improved, and the power consumption is reduced.

According to an information processing apparatus of the present invention, when the number of modes to be selected in a mode designation device is large, the mode designation key need not be depressed many times, and the desired operation mode can be designated with a simple key operation involving two stages of mode designation functions. In addition, since the normal cursor moving keys, the return key and the mode designation key are combined to realize this simple key operation, two keys for mode designation need not be arranged.

What we claim is:

1. An electric typewriter comprising:

a keyboard including character keys for inputting characters, a cursor key for shifting a cursor to designate a position of a character to be input by a character key, and a printing mode key for directing the setting of modes;

display means for displaying on a display screen the cursor, input characters and a plurality of types of the printing modes, said plurality of types of printing modes being displayed as a plurality of blocks, each block representing one said type of printing mode, and being displayed simultaneously;

cursor designating means, responsive to an operation of the cursor key, for designating a position on said display means at which the input character will be displayed when said printing mode key does not direct the setting of the printing modes, and for, alternately, sequentially designating each of said plurality of types of printing modes included in said plurality of blocks displayed by said display means when said printing mode key directs the setting of the printing modes;

printing mode selection means for selecting the types of the printing modes of all said blocks according to a shift of the cursor through all said blocks by said cursor designating means, said printing mode selection means causing one of said plurality of types of printing modes included in a block to be selected as the type of printing mode to be set when said cursor designating means designates one of said plurality of types of printing modes included in the same block, and for establishing a finally selected type of a block when a designation by said cursor designating means is shifted from said block to the next block in response to the operation of the cursor key; and display control means for controlling said display means to cause said display means to turn off the displaying of the types of printing modes in a block except for a type of mode which is established as a finally selected type of printing mode of the block by said printing mode selection means, wherein when said printing mode key is depressed, said display control means controls said display means to display the names of all the printing modes in a first block and to visually distinguish a first printing mode name in said first block from the other printing mode names in said first block because said first printing mode name is the current selected printing mode name in the first block, wherein when said cursor key is depressed for moving the cursor in one direction after said printing mode key is depressed, said display control means determines whether the first printing mode name is at the boundary between said first block and a second block, adjacent to said first block in said one direction, wherein when said display control means determines that the first printing mode name in said first block is at the boundary between the first and second blocks;

said display control means controls said display means to display only the first printing mode name in said first block;

said printing mode selection means designates a first printing mode corresponding to the first printing mode name in the first block as the current printing mode of the type of printing mode displayed in the first block; and said display control means controls said display means to display all printing mode names in said second block and to visually distinguish the printing mode name in said second block at the boundary of said first and second blocks from the other printing mode names in said second block.

2. An electronic typewriter according to claim 1, wherein said mode selecting means includes a memory with a memory capacity corresponding to the number of said plurality of modes.

3. An electronic typewriter according to claim 2, wherein said memory stores a predetermined value in response to a mode directed to be set by said printing mode key.

4. An electronic typewriter according to claim 1 further comprising display control means for turning off the display of all but the mode set in response to a second operation of said printing mode key.

5. An electronic typewriter according to claim 2 further comprising means for shifting the contents of said memory by the indication from said cursor designating means.

6. An electronic typewriter according to claim 2 further comprising a keeper memory for keeping the contents of said memory.

7. An electronic typewriter according to claim 1, wherein when said display control means determines that the first printing mode name in said first block is not at the boundary between said first and second blocks in said one direction, said display control means and said cursor designating means designate a second printing mode name, adjacent to the first printing mode name in said one direction, as the new currently selected printing mode name and visually distinguish the second printing mode name from the other printing mode names in said first block, and no longer visually distinguish the first printing mode name from the other printing mode names in said first block.

8. An electronic typewriter according to claim 1, wherein said keyboard comprises a forward cursor key and a reverse cursor key, wherein when said forward cursor key is depressed after the printing mode key is depressed and said display control means determines that the first printing mode name in said first block is not at the boundary between said first and second blocks in the reverse direction, said display control means and said cursor designating means designate a second printing mode name, adjacent to the first printing mode name in the forward direction, as the new currently selected printing mode name and visually distinguish the second printing mode name from the other printing mode names in said first block, and no longer visually distinguish the first printing mode name from the other printing mode names in said first block, and wherein when said reverse cursor key is depressed after the printing mode key is depressed and said display control means determines that the first printing mode name in said first block is not at the boundary between said first and second blocks in the forward direction, said display control means and said cursor designating means designate a second printing mode name, adjacent to the first printing mode name in the reverse direction, as the new currently selected printing mode name and visually distinguish the second printing mode name from the other printing mode names in said first block, and no longer visually distinguish the first printing mode name from the other printing mode names in said first block.

9. An electronic typewriter according to claim 1, wherein said keyboard comprises a forward cursor key and a reverse cursor key, wherein when said forward cursor key is depressed for moving the cursor to the right after said printing mode key is depressed, said display control means determines whether the first printing mode name is the rightmost printing mode name in the first block at the boundary between said first block and a second block, adjacent to said first block to the right thereof, wherein when said display control means determines that the first printing mode name in said first block is the rightmost printing mode name at the boundary between the first and second blocks:

said display control means controls said display means to display only the first printing mode name in said first block;

said printing mode selection means establishes a first printing mode, corresponding to the first printing mode name in the first block, as the current designated printing mode of the type of printing mode displayed in the first block; and said display control means controls said display means to display all printing mode names in said second block and to visually distinguish the leftmost printing mode name in said second block at the boundary of said first and second blocks from the other printing mode names in said second block, wherein when said reverse cursor key is depressed for moving the cursor to the left after said printing mode key is depressed, said display control means determines whether the first printing mode name is the leftmost printing mode name in the first block at the boundary between said first block and another block, adjacent to said first block to the left thereof, wherein when said display control means determines that the first printing mode name in said first block is the leftmost printing mode name at the boundary between the first and another blocks:

said display control means controls said display means to display only the first printing mode name in said first block;

said cursor designating means establishes a first printing mode, corresponding to the first printing mode name in the first block, as the current designated printing mode of the type of printing mode displayed in the first block; and said display control means controls said display means to display all printing mode names in said another block and to visually distinguish the rightmost printing mode name in said another block at the boundary of said first and another blocks from the other printing mode names in said another block.

10. An electronic typewriter according to claim 1, wherein said keyboard also includes a return key, wherein when said return key is depressed after said printing mode key is depressed and said display control means controls said display means to visually distinguish the first printing mode name in the first block:

said printing mode selection means establishes the first printing mode, corresponding to the first printing mode name, as the selected printing mode of the type displayed in the first block;

said display control means controls said display means to turn off the display of the other printing mode names in the first block;

said display control means controls said display means to display all the printing mode names in the second block; and said display control means controls said display means to visually distinguish the printing mode name in the second block, corresponding to the currently selected printing mode of the type in the second block, from the other printing mode names in the second block.

11. Information processing apparatus comprising:

input means including character keys for inputting characters, a cursor key for shifting a cursor to designate a position of a character to be input by a character key, and a mode key for directing the setting of modes;

display means for displaying on a display screen, the cursor, input characters and a plurality of types of the modes, said plurality of types of the modes being displayed as a plurality of blocks which are displayed simultaneously;

cursor selecting means, responsive to an operation of the cursor key, for selecting a position on said display means at which the input character will be displayed when said mode key does not direct said apparatus to set the modes, and for, alternately, sequentially selecting any one type of mode from among a plurality of types of modes displayed by said display means, and sequentially selecting each of said plurality of blocks displayed by said display means when said mode key directs the setting of the modes;

mode setting means for setting all the modes of said blocks according to a sequential selection of the types of modes through all the blocks by said cursor selecting means, said mode setting means directing the setting of a type of mode selected by said cursor selecting means in a block as a finally selected type of mode of the block and directing the selecting of a type of mode from among a plurality of types of modes of the next block in response to shifting of the cursor to the next block by the cursor key; and display control means for controlling said display means to cause said display means to turn off the display of types of modes in a block except for a type of mode which is established as a finally selected type of mode of the block by said mode setting means, wherein when said mode key is depressed, said display control means controls said display means to display the names of all the modes in a first block and to visually distinguish a first mode name in said first block from the other mode names in said first block because said first printing mode name is the current selected mode name in the first block, wherein when said cursor key is depressed for moving the cursor in one direction after said mode key is depressed, said display control means determines whether the first mode name is at the boundary between said first block and a second block, adjacent to said first block in said one direction, wherein when said display control means determines that the first mode name in said first block is at the boundary between the first and second blocks;

said display control means controls said display means to display only the first mode name in said first block;

said mode setting means designates a first mode corresponding to the first mode name in the first block as the current mode of the type of mode displayed in the first block; and said display control means controls said display means to display all mode names in said second block and to visually distinguish the mode name in said second block at the boundary of said first and second blocks from the other mode names in said second block.

12. Information processing apparatus according to claim 11 further comprising a memory with a memory position corresponding to the number of said plurality of modes.

13. Information processing apparatus according to claim 12, wherein said memory stores a predetermined value in response to the mode set by said mode set means.

14. Information processing apparatus according to claim 12 further comprising means for shifting the contents of said memory by the indication from said cursor selecting means.

15. Information processing apparatus according to claim 11 further comprising means for turning off the display of all but the mode set in response to a second operation from said mode set directing means.

16. An information processing apparatus according to claim 11, wherein when said display control means determines that the first mode name in said first block is not at the boundary between said first and second blocks in said one direction, said display control means and said cursor selecting means designate a second mode name, adjacent to the first mode name in said one direction, as the new currently selected mode name and visually distinguish the second mode name from the other mode names in said first block, and no longer visually distinguish the first mode name from the other mode names in said first block.

17. An information processing apparatus according to claim 11, wherein said input means further comprises a forward cursor key and a reverse cursor key, wherein when said forward cursor key is depressed after the mode key is depressed and said display control means determines that the first mode name in said first block is not at the boundary between said first and second blocks in the forward direction, said display control means and said cursor selecting means designate a second mode name, adjacent to the first mode name in the forward direction, as the new currently selected mode name and control said display means to visually distinguish the second mode name from the other mode names in said first block, and to no longer visually distinguish the first mode name from the other mode names in said first block, and wherein when said reverse cursor key is depressed after the mode key is depressed and said display control means determines that the first mode name in said first block is not at the boundary between said first and second blocks in the reverse direction, said display control means and said cursor designating means designate a second mode name, adjacent to the first mode name in the reverse direction, as the new currently selected mode name and control said display means to visually distinguish the second mode name from the other mode names in said first block, and to no longer visually distinguish the first mode name from the other mode names in said first block.

18. An information processing apparatus according to claim 11, wherein said input means comprises a forward cursor key and a reverse cursor key, wherein when said forward cursor key is depressed for moving the cursor to the right after said mode key is depressed, said display control means determines whether the first mode name is the rightmost mode name in the first block at the boundary between said first block and a second block, adjacent to said first block to the right thereof, wherein when said display control means determines that the first mode name in said first block is the rightmost mode name at the boundary between the first and second blocks:

said display control means controls said display means to display only the first mode name in said first block;

said mode setting means establishes a first mode, corresponding to the first mode name in the first block, as the current designated mode of the type of mode displayed in the first block; and said display control means controls said display means to display all mode names in said second block and to visually distinguish the leftmost mode name in said second block at the boundary of said first and second blocks from the other mode names in said second block, wherein when said reverse cursor key is depressed for moving the cursor to the left after said mode key is depressed, said display control means determines whether the first mode name is the leftmost mode name in the first block at the boundary between said first block and another block, adjacent to said first block to the left thereof, wherein when said display control means determines that the first mode name in said first block is the leftmost mode name at the boundary between the first and another blocks:

said display control means controls said display means to display only the first mode name in said first block;

said cursor selecting means establishes a first mode, corresponding to the first mode name in the first block, as the current designated mode of the type of mode displayed in the first block; and said display control means controls said display means to display all mode names in said second block and to visually distinguish the rightmost mode name in said another block at the boundary of said first and another blocks from the other mode names in said another block.

19. An information processing apparatus according to claim 11, wherein said input means also includes a return key, wherein when said return key is depressed after said mode key is depressed and said display control means controls said display means to visually distinguish the first mode name in the first block:

said mode setting means establishes the first mode, corresponding to the first mode name, as the selected mode of the type displayed in the first block;

said display control means controls said display means to turn off the display of the other mode names in the first block;

said display control means controls said display means to display all the mode names in the second block; and said display control means controls said display means to visually distinguish the mode name in the second block, corresponding to the currently selected mode of the type in the second block, from the other mode names in the second block.

20. Information processing apparatus comprising:

input means including character input means for inputting characters, a first shifting key for shifting a cursor to designate a position of a character to be input by said character input means, a second shifting key for shifting of the cursor, and mode input means for setting modes;

mode set directing means for directing a plurality of types of modes to be set as a plurality of blocks, in response to an operation of said mode input means;

designation input means, responsive not only to an operation of said first shifting key, but also to an operation of said second shifting key, for selecting all the types of the modes to be set according to the directing of the types of modes through all the modes by said mode set directing means when said mode set directing means directs the setting of the modes, and for, alternately designating with the cursor the character input position of said character signal by said character input means when said mode set directing means has not directed a mode setting;

display means displaying the cursor, including a first display area for displaying characters therein and a second display area for simultaneously displaying said plurality of types of modes therein in a plurality of blocks, each block comprising a plurality of mode names corresponding to different modes of the same type; and display control means for controlling said display means such that a character corresponding to said character signal input by said character input means is displayed at the character input position of said first display area when said mode set directing means has not directed a mode setting, and for displaying each of the types of modes finally selected by said designation input means at said second display area and selecting each of said plurality of blocks displayed by said display means, in response to the operation of said first shifting key and to the operation of the second shifting key when said mode set directing means directs the setting of the modes, wherein when said mode set directing means directs a plurality of modes to be set in response to actuation of said mode input means, said display control means controls said display means to display the names of all the modes in a first block and to visually distinguish a first mode name in said first block from the other mode names in said first block because said first mode name is the current selected mode name in the first block, wherein when one of said first and second shifting keys is depressed for moving the cursor in one direction after said mode input means is actuated, said display control means determines whether the first mode name is at the boundary between said first block and a second block, adjacent to said first block in said one direction, wherein when said display control means determines that the first mode name in said first block is at the boundary between the first and second blocks;

said display control means controls said display means to display only the first mode name in said first block;

said display control means designates a first mode corresponding to the first mode name in the first block as the current mode of the type of mode displayed in the first block; and said display control means controls said display means to display all mode names in said second block and to visually distinguish the mode name in said second block at the boundary of said first and second blocks from the other mode names in said second block.

21. Information processing apparatus according to claim 20, wherein said display control means includes a memory with a memory capacity corresponding to the number said plurality of modes.

22. Information processing apparatus according to claim 21, wherein said memory stores a predetermined value in response to a mode directed to be set by said mode set directing means.

23. Information Processing apparatus according to claim 21 further comprising means for shifting the contents of said memory by the indication from said designation input means.

24. Information processing apparatus according to claim 20, wherein said mode set directing means turns on and off a mode set state, said apparatus further comprising means for turning the mode set state off in response to a second operation of mode set directing means.

25. An information processing apparatus according to claim 20, wherein when said display control means determines that the first mode name in said first block is not at the boundary between said first and second blocks in said one direction, said display control means designates a second mode name, adjacent to the first mode name in said one direction, as the new currently selected mode name and control said display means to visually distinguish the second mode name from the other mode names in said first block, and to no longer visually distinguish the first mode name from the other mode names in said first block.

26. An information processing apparatus according to claim 20, wherein depressing of said first shifting key shifts the cursor in the forward direction and the depressing of the second shifting key shifts the cursor in the reverse direction, wherein when said first shifting key is depressed after the mode input means is actuated and said display control means determines that the first mode name in said first block is not at the boundary between said first and second blocks in the forward direction, said display control means designates a second mode name, adjacent to the first mode name in the forward direction, as the new currently selected mode name and controls said display means to visually distinguish the second mode name from the other mode names in said first block, and to no longer visually distinguish the first mode name from the other mode names in said first block, and wherein when said second shifting key is depressed after said input mode means is actuated and said display control means determines that the first mode name in said first block is not at the boundary between said first and second blocks in the reverse direction, said display control means designates a second mode name, adjacent to the first mode name in the reverse direction, as the new currently selected mode name and controls said display means to visually distinguish the second mode name from the other mode names in said first block, and to no longer visually distinguish the first mode name from the other mode names in said first block.

27. An information processing apparatus according to claim 20, wherein said first shifting key shifts the cursor in the forward direction to the right and said second shifting key shifts the cursor in the reverse direction to the left, wherein when said first shifting key is depressed for moving the cursor to the right after said mode input means is actuated, said display control means determines whether the first mode name is the rightmost mode name in the first block at the boundary between said first block and a second block, adjacent to said first block to the right thereof, wherein when said display control means determines that the first mode name in said first block is the rightmost mode name at the boundary between the first and second blocks:

said display control means controls said display means to display only the first mode name in said first block;

said display control means establishes a first mode, corresponding to the first mode name in the first block, as the current designated mode of the type of mode displayed in the first block; and said display control means controls said display means to display all mode names in said second block and to visually distinguish the leftmost mode name in said second block at the boundary of said first and second blocks from the other mode names in said second block, wherein when said second shifting key is depressed for moving the cursor to the left after said mode input means is actuated, said display control means determines whether the first mode name is the leftmost mode name in the first block at the boundary between said first block and a second block, adjacent to said first block to the left thereof, wherein when said display control means determines that the first mode name in said first block is the leftmost mode name at the boundary between the first and second blocks:

said display control means controls said display means to display only the first mode name in said first block;

said display control means establishes a first mode, corresponding to the first mode name in the first block, as the current designated mode of the type of mode displayed in the first block; and said display control means controls said display means to display all mode names in said second block and to visually distinguish the rightmost mode name in said second block at the boundary of said first and second blocks from the other mode names in said second block.

28. An information processing apparatus according to claim 20, wherein said input means also includes a return key, wherein when said return key is depressed after said mode input means is depressed and said display control means controls said display means to visually distinguish the first mode name in the first block:

said display control means establishes the first mode, corresponding to the first mode name, as the selected mode of the type displayed in the first block;

said display control means controls said display means to turn off the display of the other mode names in the first block;

said display control means controls said display means to display all the mode names in the second block; and said display control means controls said display means to visually distinguish the mode name in the second block, corresponding to the currently selected mode of the type in the second block, from the other mode names in the second block.

29. An information processing apparatus comprising:

input means including character input means for inputting characters, a cursor key for shifting a cursor to designate a position of a character to be input by said character input means, and mode input means for setting modes;

mode set directing means for directing a plurality of types of modes to be set as a block, in response to an operation of said mode input means;

designation input means, responsive to an operation of the cursor key, for designating all the types of the modes to be set according to the directing of the types of modes through all the modes by said mode set directing means when said mode set directing means directs the setting of the modes, and for, alternately, designating with the cursor the character input position of a character signal by said character input means when said mode set directing means has not directed a mode setting;

setting means for setting the designated type of mode, display means displaying the cursor, including a first display area for displaying characters therein and a second display area for simultaneously displaying said plurality of types of modes therein in a plurality of blocks, each block comprising a plurality of mode names corresponding to different modes of the same type; and display control means for controlling said display means such that a character corresponding to said character signal input by said character input means is displayed at the character input position of said first display area when said mode set directing means has not directed a mode setting, and for displaying a designated type of mode by said designation input means, at said second display area, wherein when said mode set directing means directs a plurality of modes to be set in response to actuation of said mode input means, said display control means controls said display means to display the names of all the modes in a first block and to visually distinguish a first mode name in said first block from the other mode names in said first block because said first mode name is the current selected mode name in the first block, wherein when said cursor key is depressed for moving the cursor in one direction after said mode input means is actuated, said display control means determines whether the first mode name is at the boundary between said first block and a second block, adjacent to said first block in said one direction, wherein when said display control means determines that the first mode name in said first block is at the boundary between the first and second blocks;

said display control means controls said display means to display only the first mode name in said first block;

said display control means designates a first mode corresponding to the first mode name in the first block as the current mode of the type of mode displayed in the first block; and said display control means controls said display means to display all mode names in said second block and to visually distinguish the mode name in said second block at the boundary of said first and second blocks from the other mode names in said second block.

30. An apparatus according to claim 29, wherein said display control means displays the designated type of mode and undesignated type of mode in different display manners, respectively.

31. An apparatus according to claim 29, wherein said display control means controls said display means to display a plurality of blocks in said second display area.

32. An information processing apparatus according to claim 29, wherein when said display control means determines that the first mode name in said first block is not at the boundary between said first and second blocks in said one direction, said display control means designates a second mode name, adjacent to the first mode name in said one direction, as the new currently selected mode name and controls said display means to visually distinguish the second mode name from the other mode names in said first block, and to no longer visually distinguish the first mode name from the other mode names in said first block.

33. An information processing apparatus according to claim 29, further comprising forward and reverse cursor keys, wherein depressing of said forward cursor key shifts the cursor in the forward direction and the depressing of the reverse cursor key shifts the cursor in the reverse direction, wherein when said forward cursor key is depressed after the mode input means is actuated and said display control means determines that the first mode name in said first block is not at the boundary between said first and second blocks in the forward direction, said display control means designates a second mode name, adjacent to the first mode name in the forward direction, as the new currently selected mode name controls said display means to visually distinguish the second mode name from the other mode names in said first block, and to no longer visually distinguish the first mode name from the other mode names in said first block, and wherein when said reverse cursor key is depressed after said input mode means is actuated and said display control means determines that the first mode name in said first block is not at the boundary between said first and second blocks in the reverse direction, said display control means designates a second mode name, adjacent to the first mode name in the reverse direction, as the new currently selected mode name and controls said display means to visually distinguish the second mode name from the other mode names in said first block, and to no longer visually distinguish the first mode name from the other mode names in said first block.

34. An information processing apparatus according to claim 29, further comprising forward and reverse cursor keys, wherein said forward cursor key shifts the cursor in the forward direction to the right and said reverse shifting key shifts the cursor in the reverse direction to the left, wherein when said forward cursor key is depressed for moving the cursor to the right after said mode input means is actuated, said display control means determines whether the first mode name is the rightmost mode name in the first block at the boundary between said first block and a second block, adjacent to said first block to the right thereof, wherein when said display control means determines that the first mode name in said first block is the rightmost mode name at the boundary between the first and second blocks:

said display control means controls said display means to display only the first mode name in said first block;

said display control means establishes a first mode, corresponding to the first mode name in the first block, as the current designated mode of the type of mode displayed in the first block; and said display control means controls said display means to display all mode names in said second block and to visually distinguish the leftmost mode name in said second block at the boundary of said first and second blocks from the other mode names in said second block, wherein when said reverse cursor key is depressed for moving the cursor to the left after said mode input means is actuated, said display control means determines whether the first mode name is the leftmost mode name in the first block at the boundary between said first block and a second block, adjacent to said first block to the left thereof, wherein when said display control means determines that the first mode name in said first block is the leftmost mode name at the boundary between the first and second blocks:

said display control means controls said display means to display only the first mode name in said first block;

said display control means establishes a first mode, corresponding to the first mode name in the first block, as the current designated mode of the type of mode displayed in the first block; and said display control means controls said display means to display all mode names in said second block and to visually distinguish the rightmost mode name in said second block at the boundary of said first and second blocks from the other mode names in said second block.

35. An information processing apparatus according to claim 29, wherein said input means also includes a return key, wherein when said return key is depressed after said mode input means is depressed and said display control means controls said display means to visually distinguish the first mode name in the first block:

said display control means establishes the first mode, corresponding to the first mode name, as the selected mode of the type displayed in the first block;

said display control means controls said display means to turn off the display of the other mode names in the first block;

said display control means controls said display means to display all the mode names in the second block; and said display control means controls said display means to visually distinguish the mode name in the second block, corresponding to the currently selected mode of the type in the second block, from the other mode names in the second block.

36. An information processing apparatus comprising:

input means including character input means for inputting a plurality of characters, and a cursor key for shifting a cursor;

mode set means for directing a plurality of types of modes to be set;

display means displaying the cursor, including a first display area for displaying characters therein and a second display area for simultaneously displaying said plurality of types of modes therein in a plurality of blocks, each block comprising a plurality of mode names corresponding to different modes of the same type;

designation input means for designating with the cursor the character input position of said character to be inputted by said character input means when said mode set means has not directed a mode setting and for designating with the cursor a type of mode of a plurality of types of modes in response to an operation of the cursor key when said mode set means directs a mode setting;

setting means for setting the designated type of mode; and display control means for controlling said display means such that a character corresponding to said character input by said character input means is displayed at the character input position on display means when said mode set directing means has not directed a mode setting, and for displaying the designated type of mode designated by said designation input means, said display control means controlling said display means so that the designated type of mode and an undesignated type of mode are displayed in different display manners, respectively, wherein when said mode set means directs a plurality of modes to be set, said display control means controls said display means to display the names of all the modes in a first block and to visually distinguish a first mode name in said first block from the other mode names in said first block because said first mode name is the current selected mode name in the first block, wherein when said cursor key is depressed for moving the cursor in one direction after said mode set means directs the plurality of modes to be set, said display control means determines whether the first mode name is at the boundary between said first block and a second block, adjacent to said first block in said one direction, wherein when said display control means determines that the first mode name in said first block is at the boundary between the first and second blocks;

said display control means controls said display means to display only the first mode name in said first block;

said display control means designates a first mode corresponding to the first mode name in the first block as the current mode of the type of mode displayed in the first block; and said display control means controls said display means to display all mode names in said second block and to visually distinguish the mode name in said second block at the boundary of said first and second blocks from the other mode names in said second block.

37. An information processing apparatus according to claim 36, wherein when said display control means determines that the first mode name in said first block is not at the boundary between said first and second blocks in said one direction, said display control means designates a second mode name, adjacent to the first mode name in said one direction, as the new currently selected mode name and controls said display means to visually distinguish the second mode name from the other mode names in said first block, and to no longer visually distinguish the first mode name from the other mode names in said first block.

38. An information processing apparatus according to claim 36, further comprising forward and reverse cursor keys, wherein depressing of said forward cursor key shifts the cursor in the forward direction and the depressing of the reverse cursor key shifts the cursor in the reverse direction, wherein when said forward cursor key is depressed after the mode set means directs setting of the plurality of modes and said display control means determines that the first mode name in said first block is not at the boundary between said first and second blocks in the forward direction, said display control means designates a second mode name, adjacent to the first mode name in the forward direction, as the new currently selected mode name and visually distinguishes the second mode name from the other mode names in said first block, and no longer visually distinguishes the first mode name from the other mode names in said first block, and wherein when said reverse cursor key is depressed after said mode set means directs the setting of the plurality of modes and said display control means determines that the first mode name in said first block is not at the boundary between said first and second blocks in the reverse direction, said display control means designates a second mode name, adjacent to the first mode name in the reverse direction, as the new currently selected mode name and controls said display means to visually distinguish the second mode name from the other mode names in said first block, and to no longer visually distinguish the first mode name from the other mode names in said first block.

39. An information processing apparatus according to claim 36, further comprising forward and reverse cursor keys, wherein said forward cursor key shifts the cursor in the forward direction to the right and said reverse shifting key shifts the cursor in the reverse direction to the left, wherein when said forward cursor key is depressed for moving the cursor to the right after said mode set means directs the setting of the plurality of modes, said display control means determines whether the first mode name is the rightmost mode name in the first block at the boundary between said first block and a second block, adjacent to said first block to the right thereof, wherein when said display control means determines that the first mode name in said first block is the rightmost mode name at the boundary between the first and second blocks:

said display control means controls said display means to display only the first mode name in said first block;

said display control means establishes a first mode, corresponding to the first mode name in the first block, as the current designated mode of the type of mode displayed in the first block; and said display control means controls said display means to display all mode names in said second block and to visually distinguish the leftmost mode name in said second block at the boundary of said first and second blocks from the other mode names in said second block, wherein when said reverse cursor key is depressed for moving the cursor to the left after said mode set means directs the setting of the plurality of modes, said display control means determines whether the first mode name is the leftmost mode name in the first block at the boundary between said first block and a second block, adjacent to said first block to the left thereof, wherein when said display control means determines that the first mode name in said first block is the leftmost mode name at the boundary between the first and second blocks:

said display control means controls said display means to display only the first mode name in said first block;

said display control means establishes a first mode, corresponding to the first mode name in the first block, as the current designated mode of the type of mode displayed in the first block; and said display control means controls said display means to display all mode names in said second block and to visually distinguish the rightmost mode name in said second block at the boundary of said first and second blocks from the other mode names in said second block.

40. An information processing apparatus according to claim 36, wherein said input means also includes a return key, wherein when said return key is depressed after said mode set means directs the setting of the plurality of modes and said display control means controls said display means to visually distinguish the first mode name in the first block:

said display control means establishes the first mode, corresponding to the first mode name, as the selected mode of the type displayed in the first block;

said display control means controls said display means to turn off the display of the other mode names in the first block;

said display control means controls said display means to display all the mode names in the second block; and said display control means controls said display means to visually distinguish the mode name in the second block, corresponding to the currently selected mode of the type in the second block, from the other mode names in the second block.

* * * * *

UNITED STATES PATENT AND TRADEMARK OFFICE
CERTIFICATE OF CORRECTION

PATENT NO. : 5,838,324
DATED : Nov. 17, 1998
INVENTOR(S) : Tomohiro Maekawa, et al.

It is certified that error appears in the above-identified patent and that said Letters Patent is hereby corrected as shown below:

Column 2
  Line 59, "buffer" should read --buffer memory BUF--.
  Line 60, "BUF memory" should be deleted.

Column 3
  Line 58, "jaens" should read --means--.

Column 4
  Line 56, "a" should read --an--.

Column 13
  Line 22, "for," should read --for--.

Column 14
  Line 8, "said" should read --of said--.
  Line 30, "control" should read --controls--.

SHEET 4 OF THE DRAWINGS
  In Step S20, "INDICATOR" should read --INDICATORS--.

Signed and Sealed this

Seventh Day of September, 1999

Attest:

Q. TODD DICKINSON

Attesting Officer     Acting Commissioner of Patents and Trademarks